United States Patent [19]

Segawa et al.

[11] Patent Number: 5,105,416
[45] Date of Patent: Apr. 14, 1992

[54] OPTICAL DISC RECORDING/REPRODUCING CONTROL

[75] Inventors: Hideki Segawa, Sagamihara; Michihara Abe, Yokohama, both of Japan

[73] Assignee: Ricoh Company, Ltd., Tokyo, Japan

[21] Appl. No.: 323,316

[22] Filed: Mar. 14, 1989

[30] Foreign Application Priority Data

Mar. 14, 1988 [JP] Japan ................... 63-59997
Mar. 14, 1988 [JP] Japan ................... 63-59998

[51] Int. Cl.$^5$ ........................................ G11B 7/00
[52] U.S. Cl. ........................ 369/116; 369/59; 369/54; 369/44.39
[58] Field of Search ............... 369/122, 116, 100, 45, 369/59, 54, 44.39; 372/25

[56] References Cited

U.S. PATENT DOCUMENTS 4,428,075  1/1984  Hazel et al. .................. 369/111
4,885,458 12/1989  Horiguchi et al. ........... 369/44.39
4,888,753 12/1989  Enari et al ..................... 369/32

FOREIGN PATENT DOCUMENTS 0078740  4/1987  Japan ............................ 369/116

Primary Examiner—Roy N. Envall, Jr.
Assistant Examiner—Nabil Hindi
Attorney, Agent, or Firm—Cooper & Dunham

[57] ABSTRACT

An optical disc is divided into a plurality of sectors each of which includes an address section, a flag section and a data section. First sector management data are stored in the flag section, normally in the form of a flag pit. In one aspect of the invention, the first sector management data are recorded in the flag section at higher laser beam power than the power used for recording data in the data section. In another aspect of the invention, second sector management data are additionally stored in the data section in the form of a special pattern. In this case, the second sector management data are read out if no sector management data have been read from the flag section of the sector.

4 Claims, 3 Drawing Sheets

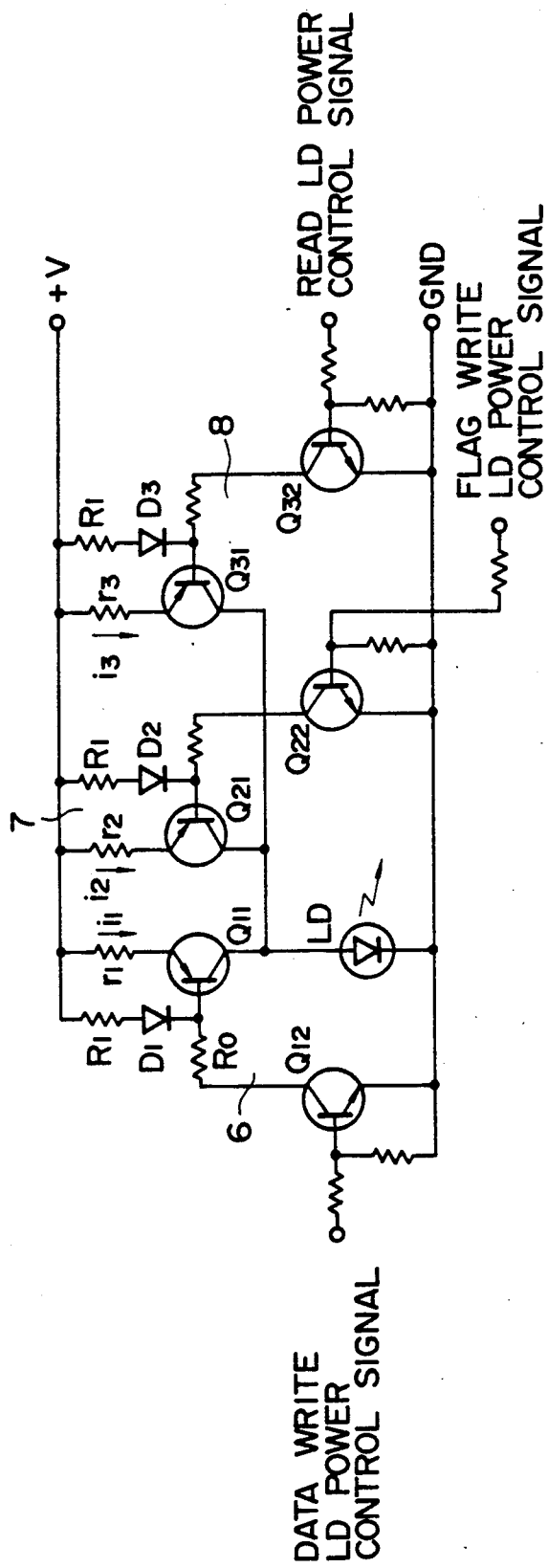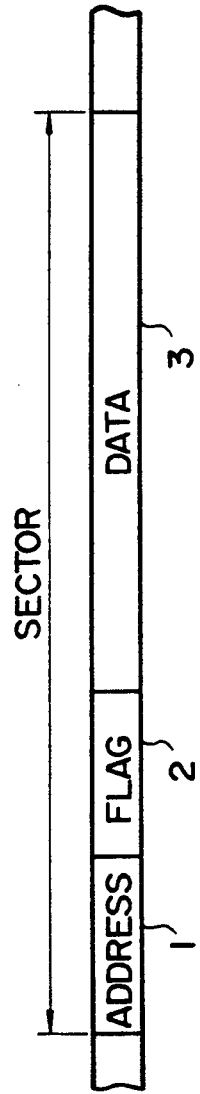

(a) RF SIGNAL WITH PROPER RECORDING POWER (b) RF SIGNAL WITH EXCESSIVE RECORDING POWER

OPTICAL DISC RECORDING/REPRODUCING CONTROL

BACKGROUND OF THE INVENTION

1. Field of the Invention

This invention generally relates to an optical disc recording/reproducing system and in particular to a control method and system for controlling a recording and/or reproducing operation in such an optical disc system.

2. Description of the Prior Art

In general, an optical disc, for example, of 5.25 inches can store data of up to approximately 200-800 megabytes. When storing data on such an optical disc, data are stored in a predetermined format and sector by sector as shown in FIG. 2. One sector generally includes an address section 1, a flag section 2 and a data section 3, and the data section 3 normally has a capacity to store 512-2048 bytes of data. The flag section 2 is a section for storing sector management information, such as information for indicating whether or not a particular sector is in use and whether or not processing for an alternative sector has been completed, other than the data which users wish to store. For this reason, the information stored in the flag section 2 is very important. Because, if the information indicating whether or not a particular sector is in use has been erroneously interpreted, although valid data are stored in that sector, new data are written into that sector to thereby destroy the original valid data (overwriting) unintentionally.

The detailed structure of the flag section in a sector is diagrammatically shown in FIG. 3. During recording (writing), at a predetermined timing $T_1$ from a sync pit of preformat pit 4 which has been previously formed on an optical disc, a high power laser beam for writing information on a recording film of the optical disc irradiates the optical disc to thereby form a flag pit 5. The flag pit 5 is also a record pit and the presence or absence of this pit constitutes sector management information. During reproduction, the presence of absence of such a flag pit 5 is determined depending on whether an RF signal at a timing $T_1$ after the sync pit 4 in a manner similar to that of the recording mode is higher or lower than a predetermined threshold level, and thus this information constitutes sector management information.

If the amplitude of the RF signal corresponding to the flag pit 5 is not sufficiently high, it may not exceed the threshold level. For example, due to fluctuations in laser power and/or defects on the surface of the optical disc, the amplitude of the RF signal corresponding to the flag pit 5 decreases. The amplitude of the flag pit 5 mainly depends on the power of the writing laser beam, and the larger the power of the writing laser beam, the higher the amplitude of the flag pit 5. Thus, it is preferable to set the power of the writing laser beam high in order to secure writing or recording of a flag pit 5. On the other hand, a record pit (not shown) in the data section 3 will have a larger amplitude if the power of writing laser beam is larger. However, if the power of laser beam is excessively increased, a pit duty ratio, i.e., a ratio between a pit length ($T_{PIT}$) and a pit-to-pit length ($T_{LAND}$), shifts from a desired state as shown in FIG. 4(a) to an undesired state as shown in FIG. 4(b). As a result, there can be jitter in the signal.

In accordance with the prior art approach, in order not to increase jitter during reproduction of data from the data section 3, adjustments are made to obtain appropriate recording power to produce a desired pit duty ratio as shown in FIG. 4(a), and the flat pit 5 in the flag section 2 is also recorded using the same writing power. In accordance with this approach, since the flag pit 5 is defined using the writing power which has been adjusted in relation to the pit duty ratio for the data section 3, there could arise a problem of erroneous recognition of flag information.

SUMMARY OF THE INVENTION

In accordance with one aspect of the present invention, a plurality of levels are set in the same sector for the laser output to be used for writing information on an optical disc. And, the level of laser output is set higher for writing information into a flag section of a sector than for writing information into a data section of the sector.

In accordance with another aspect of the present invention, use is made of both flag information in a flag section and special pattern information in a data section as sector management information of an optical disc. And, if the sector management information cannot be obtained from the flag section during reproduction, the sector management information is obtained from the special pattern information in the data section of the corresponding sector.

It is therefore a primary object of the present invention to obviate the disadvantages of the prior art as described above and to provide an improved method and system for controlling a writing (recording) and/or reproducing operation of an optical disc system.

Another object of the present invention is to provide an improved optical disc recording/reproducing method and system.

A further object of the present invention is to provide an improved optical disc recording/reproducing method and system having high reliability, low jitter and low processing time.

Other objects, advantages and novel features of the present invention will become apparent from the following detailed description of the invention when considered in conjunction with the accompanying drawings.

DESCRIPTION OF THE DRAWINGS

FIG. 1 is a circuit diagram showing a control circuit for controlling an output level of a laser beam constructed in accordance with one embodiment of the present invention;

FIG. 2 is an illustration showing the structure of a typical sector defined in an optical disc;

DESCRIPTION OF THE PREFERRED EMBODIMENTS

Figure 3:
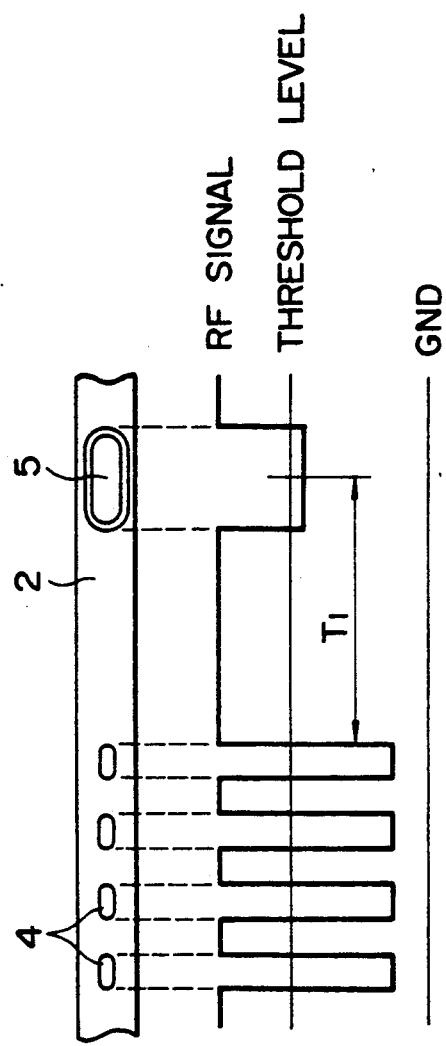
FIG. 3 is an illustration showing the detailed structure of a flag section of a sector in an optical disc.
Figure 4:
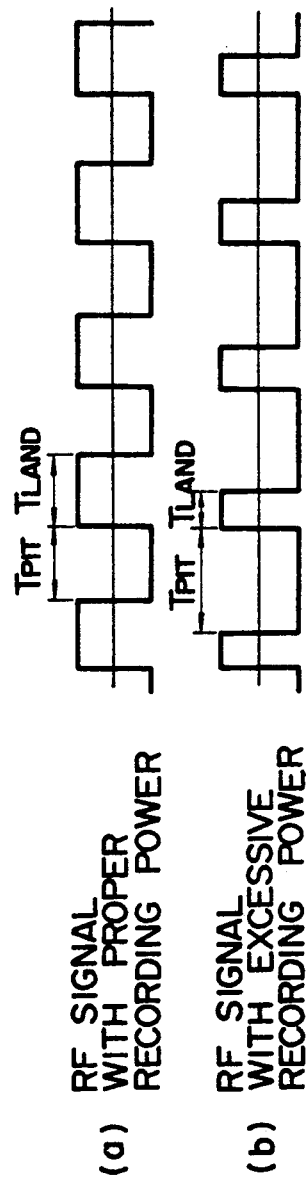
FIG. 4 is an illustration showing an RF signal produced from a series of record pits in a data section of a sector.

Referring now to FIG. 1, there is shown a control circuit for controlling an output level of a laser beam when it is used for writing information on an optical disc. The laser beam output level may be selectively set at one of a plurality of levels within the same sector, for example at two different levels, and the laser output power is increased to a higher level when recording a flag pit 5 of a flag section 2 as compared with the case of recording record pits in a data section 3. With this scheme, use is made of writing power which minimizes jitter for the data section 3 and of writing power which records a flag pit 5 having a sufficiently large amplitude in the flag section 2. As a result, in accordance with this aspect of the present invention, both sector management information by flag pit 5 and record information of the data section 3 can be reproduced reliably.

FIG. 1 illustrates a circuit structure for controlling laser output power at two levels during writing and also for controlling laser output power during reproduction. The illustrated control circuit includes a semiconductor laser LD which serves as a light source for recording and/or reproducing information to and from an optical disc (not shown). The control circuit also includes a data write (record) control unit 6, a flag write (record) control unit 7 and a reproduction control unit 8, which are connected in parallel to the laser LD. Each of these control units 6 through 8 is substantially identical in structure. For example, the data write control unit 6 includes a driver transistor $Q_{11}$ and a resistor $r_1$ which are connected in series to the semiconductor laser LD to supply drive current $i_1$ thereto. A series connection of a resistor $R_1$ and a diode $D_1$ is connected in parallel with a series connection of the resistor $r_1$ and the drive transistor $Q_{11}$, and a switching transistor $Q_{12}$ is connected to the base of the driver transistor $Q_{11}$ through a resistor $R_0$. The switching transistor $Q_{12}$ is rendered to be on or off by a data writing LD power control signal. Each of the remaining control units 7 and 8 is similarly constructed.

With the above-described structure, when any of the driver transistors $Q_{il}$ is driven, the drive current $i_i$ flowing through the semiconductor laser LD may be expressed by the following manner.

$$i_i = (R_1/r_i) \cdot ((V - vd - V_{CE})/(R_1 + R_0))$$

Here,
 vd: Forward biased voltage of diode $D_i$;
 $V_{CE}$: Collector-emitter voltage with the driver transistor on.
For each of the control units 6 through 8, the value of $R_1(V - vd - V_{CE})/(R_1 + R_0)$ is common and constant.

Thus, the level of the laser power or drive current during writing is determined by the magnitude of each of the resistors $r_1$ through $r_3$ of the respective control units 6 through 8. If $r_3$ is significantly larger than $r_1$ which in turn is larger than $r_2$, the laser power can be set at maximum while information is written into a flag section 5. And, in either of a data section writing mode and a flag section writing mode, the driver transistor $Q_{31}$ for use in reproduction of data is on so that low level drive current is always supplied even if driver transistor $Q_{11}$ or $Q_{21}$ is off.

In the case of an CAV (constant angular velocity) type optical disc system in which the number of revolution is maintained at constant, the linear speed differs twice or more between an inner portion and an outer portion of an optical disc so that the laser power is varied between the radially inner and outer portions during writing. Even in this system, information is recorded in the flag and data sections of the same sector using the same writing laser power. Therefore, the above-described aspect of the present invention can be advantageously applied also in this type of system.

As described above, in accordance with this aspect of the present invention, the laser output power can be set at a plurality of levels for the same sector of an optical disc during writing, and the laser output power is set a higher level when writing information in the flag section than writing information in the data section. Therefore, information can be written in the data section while keeping jitter minimized and in the flag section with a sufficiently large pit amplitude, thereby reducing erroneous reading of sector management information and preventing disadvantages, such as overwriting.

Now, another aspect of the present invention will be described below. In accordance with this aspect of the present invention, the structure shown in FIGS. 2 and 3 will be used as a basic structure. That is, in accordance with this aspect of the present invention, the data format will have a structure shown in FIG. 2 which includes an address section 1, a flag section 2 and a data section 3 to define a sector. And, a flag pit 5 is written into the flag section 2 as sector management information. In accordance with this aspect of the present invention, additional sector information is written in the data sector 3 in a special pattern so that both of these items of sector management information are used.

Thus, if a flag signal which indicates the presence of a flag pit 5 in the flag section 2 has been reproduced and detected, the system may proceed to a next step, for example reporting that "the current sector is in use", in accordance with the contents of the flag signal. On the other hand, if no flag pit 5 has been detected during reproduction of flag section 2, it is not immediately decided that there is an "absence of a flag pit in flag section 2", but instead proceeds to the system check whether or not a special pattern which constitutes additional sector information is present in the data sector 3. Accordingly, since the data section 3 is also checked for the presence or absence of additional sector management information if no sector management information has been detected in the flag section 2, the detection of sector management information made more likely. It is to be noted that the detection of the presence or absence of a flag pit 5 in the data section 3 is carried out only when no flag pit has been found in the flag section 2, so that this would not unduly prolong the overall processing time.

Figure 5:
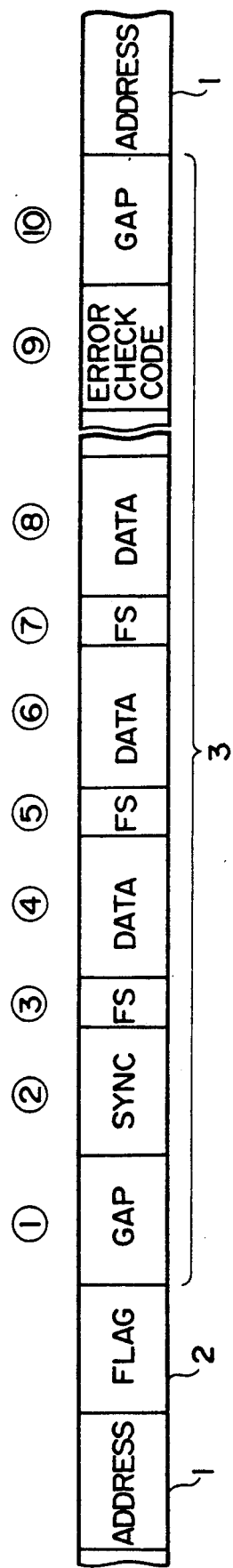
FIG. 5 is an illustration showing the structure of a data section of a sector in accordance with another embodiment of the present invention.

Now, referring to FIG. 5, the sector management information having a special pattern and stored in the data section 3 will be described. As shown, the data section 3 includes segmented data portions (areas actually usable by users) 4, 6 and 8 each of which is preceded by a corresponding one of frame sync portions FS 3, 5 and 7. The frame sync FS is a sync bit pattern such as a pattern which is constructed to easily detect bit slips. As a result, it is almost impossible that exactly the same signal would occur due to noise or defects. In accordance with this aspect of the present invention, a special pattern of these frame sync portions FS present in the data section 3 is used as a part of the sector management information, i.e., information indicating whether the current sector is in use or not. That is, if data has not yet been written in the data section 3 (non-use state), these frame sync signals FS would not be produced from the data section 3. On the other hand, if data has already been written in the data section 3, one or more frame sync signals FS will necessarily be produced from the data section 3. Thus, by counting such frame sync signals FS, it can be determined whether or not the current sector is in use or not. Accordingly, this aspect of the present invention allows to prevent overwriting even if no flag pit 5 has been detected from the flag section 2 though such a flag pit 5 is actually present in the flag section 2.

In place of such frame sync signals FS, the sync pattern 2 having a special pattern in the leading portion of the data section 3 may be used as the sector management information which indicates whether the sector in question is in use or not. In this case, if three or more sync bits have been found in the data section 3, it may be determined that data is actually recorded in the data section 3 and thus the sector is in use.

Alternatively, a special pattern of the error check code 9 in the data section 3 may be used as the sector management information which indicates whether or not the contents of the sector have been transferred to a substitute sector. And, if this error check code is abnormal, it is determined that the contents of the current sector have been transferred to a substitute sector, thereby allowing a reproduction process of the substitute sector. That is, in accordance with this scheme, if the current sector has been determined to include incorrectable data by looking at the error check code provided at the trailing portion of the data section 3, the data of the substitute sector is also produced.

A substitute sector is used when, immediately after writing data, the data are read and reproduced for verification and it is found that data errors have occurred beyond a predetermined value and thus the errors cannot be corrected. The data of that sector then are disregarded and the dame data are written into a substitute sector. In this case, a flag pit is formed in the flag section of the first sector to thereby leave sector management information which indicates the fact that the contents of this sector have been transferred to or rewritten in a substitute sector. During reproduction, the system proceeds to reading the data in the designated substitute sector based on the signal in this flag section. That is, the data section 3 in the current sector is not read. In a system in which the error check code in the data sector 3 is to be used as a reference to a substitute sector, even if the detection has failed for the flag section 2, the process is not interrupted (as an error), but instead proceeds to a step for processing the substitute sector.

As described above, in accordance with this aspect of the present invention, use is made of both flag pit information in the flag section and special pattern information in the data section as sector management information of an optical disc. And, sector management information is obtained from the special pattern in the data section in the current sector if no sector management information has been obtained from the flag section during reproduction. Thus, even if the detection of sector management information in the flag section has failed, the presence or absence of such sector management information may be confirmed again in the data section. As a result, the detection of sector management information may be insured to thereby prevent overwriting and enhance the reliability of sector management information.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A method for writing information on an optical disc in sectors each of which has a flag section and a data section by using a laser source which generates a writing light beam, comprising controlling the laser source during the writing of information into a sector to make the power level of the writing light beam higher for writing information in said flag section of the sector than for writing information in said data section of the sector.

2. A recording/reproducing method of an optical disc having sectors each of which includes a flag section and a data section, wherein first sector management information is stored in said flag section and second sector management information is stored in said data section of each sector, comprising reading out said flag section and reading out said second sector management information from said data section of a sector if first sector management information has not been obtained from said reading out of said flag section of the sector.

3. A method as in claim 2 in which said first sector management information indicates whether the data section of the sector is already in use and said reading out of said second sector management information takes place when said first sector management information indicates that the data section of the sector is not in use.

4. A method as in claim 1 in which said controlling comprises driving the laser source at a higher electrical current level when writing information in the flag section of a sector than when writing information in the data section of the sector.

* * * * *